Figure 1:
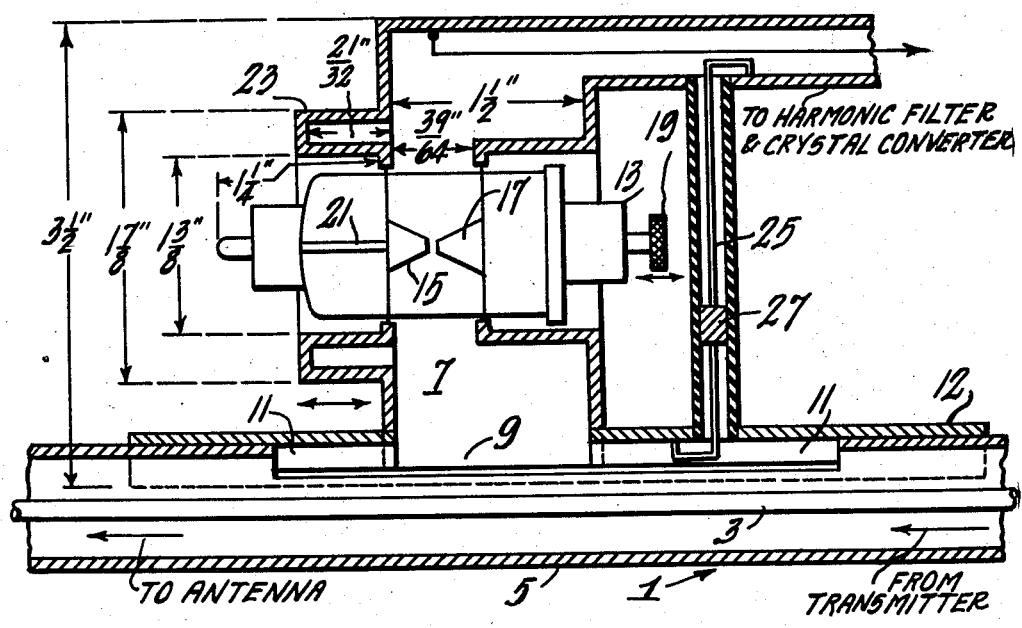

March 31, 1959   R. W. HOWERY   2,880,397
MICROWAVE SWITCHING DEVICE
Filed Sept. 4, 1951

INVENTOR
Richard W. Howery
BY
J. L. Whittaker
ATTORNEY

United States Patent Office 2,880,397
Patented Mar. 31, 1959

2,880,397

MICROWAVE SWITCHING DEVICE

Richard W. Howery, Haddonfield, N.J., assignor to Radio Corporation of America, a corporation of Delaware Application September 4, 1951, Serial No. 245,034

9 Claims. (Cl. 333—13)

This invention relates generally to microwave switching devices and more particularly to a transmit-receive cavity resonator switch device wherein the resonator is tuned by varying the spacing of a pair of T-R tube discharge electrodes contained therein. The device is especially adapted for radar antenna duplexing and novel features thereof include a reactance element for maintaining a particular component of leakage energy associated with the operation of said device substantially constant for different values of tuning of the device.

In operation, a gas-filled T-R tube disposed within the resonator at a point of high electric field stress conducts when the level of microwave energy produced by a radar transmitter exceeds a predetermined value. The T-R device is disposed at a T-junction between the transmitter, receiver, and a common antenna. This conduction effectively isolates the radar receiver from the radar transmitter during the emission of the high power transmitted pulses and prevents damage to a sensitive crystal converter in the receiver.

The leakage energy which passes through the cavity resonator to the receiver consists of three components: (1) spike energy, (2) direct coupled energy, and (3) arc leakage energy. The spike energy is defined as the energy transmitted to the receiver during the time interval between the beginning of the transmitter pulse and the establishment in the gas-filled T-R tube of a steady state R.-F. discharge. The direct coupled leakage energy is that energy which is coupled from the transmitter to the receiver by the finite inductance of the T-R resonator walls and the tube cones. The arc leakage energy is the energy incident upon the receiver caused by the voltage drop across the gap of the T-R tube.

The proper design of the T-R resonator and the selection of the T-R tube disposed therein afford suitable receiver protection against spike leakage energy. However, the combination of the direct coupled and arc leakage energies, if no compensation is made therefor, causes the sensitivity of the receiver crystal to decrease appreciably For a fixed frequency output from the radar transmitter the effects of the direct-coupled and arc-leakage energy components upon crystal sensitivity may be reduced by utilizing an out-of-phase component of the transmitter signal to buck out the leakage energy.

The receiver protection problem is complicated, however, when it is desirable to operate the radar transmitter at different output signal frequencies. When the transmitter signal frequency is changed it then is necessary to correspondingly tune the T-R resonator. While the resonator may be tuned by use of tuning slugs, this means is not usually desirable since the tuning rate is relatively slow and the insertion loss is high while the leakage energy varies rapidly. Assuming that the resonator is to be tuned by varying the spacing between the T-R tube cones, the impedance of the gap changes and when the T-R tube conducts current the amount of arc leakage energy coupled to the receiver is variable in an amount determined by said tuning. It then is necessary to readjust the amount of out of phase energy required to buck out the direct coupled and arc leakage energies since, while the direct coupled leakage energy is substantially constant for a given transmitter power output, the arc leakage energy is variable.

According to the instant invention, a reactance element is disposed in the flow path of the T-R tube current, the reactance being of sufficient value to make small the amount of arc leakage energy coupled from the resonator and diminish the effect of the aforementioned change in gap impedance thus maintaining substantially constant the amount of leakage energy coupled from the T-R resonator. The invention is utilized to cause the resonator leakage energy to be passive for different values of tuning thereof.

An object of the invention is to provide an improved switching device for controlling the flow of microwave energy.

Another object of the invention is to provide a microwave switch especially adapted for use in a radar system, said switch providing improved receiver protection.

Another object of the invention is to provide means for increasing the operating life of discharge tubes utilized in T-R type cavity resonators.

A further object of the invention is to provide a T-R type cavity resonator in which the leakage energy coupled therefrom is substantially independent of the T-R tube gap spacing and is substantially constant for different values of T-R tube tuning of said resonator.

A still further object of the invention is to reduce the number of manual tuning adjustments required for shifting the output signal frequency of a radar transmitter.

According to a typical embodiment of the invention, a coaxial inductive stub is effectively connected in series with the cones of a gas discharge T-R tube. When the T-R tube fires and the conduction current flowing therein reaches a steady state value, a relatively fixed finite voltage (which may be of the order of 100 volts) is developed across the gap between the T-R tube cones. The discharge current sees the series impedance comprising, respectively, the impedances of the T-R tube cones, the gap impedance, the impedance of the T-R cavity resonator, and the impedance of the coaxial stub. Normally, in devices not utilizing the reactive stub herein disclosed, the cone impedances are very small compared to the gap and resonator impedances. Hence a change in gap impedance causes the leakage power coupled from the resonator to change appreciably.

When, however, the impedance of the coaxial stub (large compared to the gap impedance) is added to this series circuit, the arc leakage variation previously obtained in tuning the T-R resonator, by changing the spacing between the T-R tube cones, is reduced since the proportional change in the circuit impedance is reduced. Since the voltage drop across the T-R tube gap is relatively fixed and the series circuit impedance variation is substantially constant, the arc leakage power coupled from the resonator is substantially constant and is small because more of the fixed voltage is developed across the stub impedance than is developed for leakage coupling.

It may be seen that although the arc leakage power has been maintained substantially constant, the added stub impedance causes the direct coupled leakage to increase. Since the direct coupled leakage is independent of the resonator tuning and varies only with changes in transmitter power, the direct leakage power may be bucked out by an out-of-phase component of the transmitter power.

Figure 2:
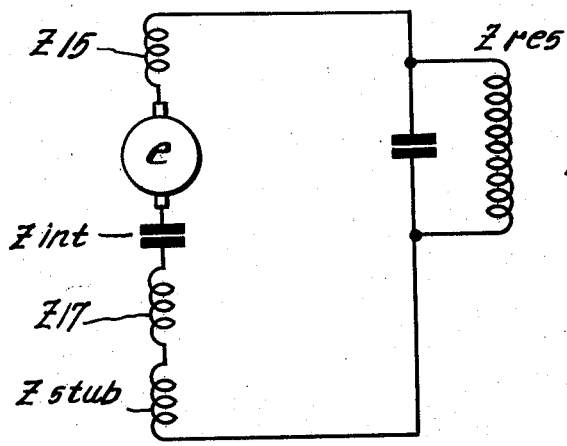

The invention will be described in greater detail with reference to the accompanying drawing in which Figure 1 is a cross-sectional drawing of a microwave switching device in which a coaxial inductive stub, according to a preferred embodiment of the invention, is utilized for the protection of sensitive radar receiver elements; and Figure 2 is an equivalent circuit diagram explanatory of the operation of the switching device of Figure 1.

Referring to Figure 1 of the drawing, the high power radar pulse produced by a radar transmitter (not shown) is propagated along a coaxial transmission line 1, having concentric inner 3 and outer 5 conductors, and applied to a load (not shown). A re-entrant cavity resonator 7 is iris-coupled to the transmission line 1 by means of apertures 9 and 11 disposed adjacent each other. Aperture 9 is located in the resonator wall adjacent the coaxial transmission line. The second aperture 11 is located in the outer conductor 5 of the coaxial line 1 and is preferably of greater axial length than the first aperture. A flange 12 is mechanically connected to the resonator 7 and is complementarily shaped to seat upon the outer conductor 5 of the transmission line. The flange 12 enables the T-R (or re-entrant) resonator 7 to be longitudinally positioned on the transmission line for suitably coupling energy therefrom.

A gas-filled T-R tube 13 is preferably axially disposed within the resonator 7 at a point of high electric field strength. The tube 13 includes a pair of truncated cones 15 and 17, the spacing between which may be controlled manually by an adjusting member 19 for tuning the resonator. A "keep-alive" electrode 21 is also contained in the tube 13 and is utilized for diffusing electrons into the gap between the two cones 15 and 17 and reducing the effects of the previously-mentioned spike leakage. A typical tube which operates satisfactorily in the present invention is the 1B27.

Referring to the equivalent circuit of Figure 2, when the transmitter energy coupled into the resonator 7 is sufficiently great enough to cause the T-R tube 13 to fire, the steady state voltage developed across the gap between the two cones 15 and 17 may be represented as a generator having an output voltage of $e$ and an internal impedance $Z_{int}$ which is dependent upon the gap spacing. The impedance of the cones 15 and 17 is represented as $Z_{15}$ and $Z_{17}$. The resonator impedance $Z_{res}$ comprises the parallel combination of the resonator capacitive and inductive reactances. The impedances $Z_{15}$ and $Z_{17}$ are small compared to the impedance of the T-R tube gap $Z_{int}$ and the impedance of the resonator $Z_{res}$. A change in the radar transmitter frequency requires retuning the T-R resonator. In accomplishing this with gap space tuning the gap impedance changes and the arc leakage power coupled from the resonator changes. This variation normally necessitates a further manual adjustment for cancelling the leakage power coupled to the receiver converter crystal.

Referring back to Figure 1, the instant invention obviates this and other disadvantages by utilizing a coaxial stub 23 effectively in series with the resonator and having its longitudinal axis parallel with the electric field set up therein. The stub 23 comprises a short-circuited coaxial line of length less than $$\frac{\lambda}{4}$$

where $\lambda$ is the electrical wavelength of the resonator. The impedance $Z_{stub}$ of the stub appears as inductive reactance in the circuit of Figure 2, since the short-circuited line is less than a quarter wave length long. The amount of impedance required in the stub to overcome the variation in gap impedance is determined by the formula $$X_L = Z_0 \tan \frac{2\pi l}{\lambda}$$

where $Z_0$ is the characteristic impedance of the short-circuited coaxial stub, $l$ is the length of the stub to the short-circuit, and $\lambda$ is the wavelength in air at the transmitter frequency.

As previously stated the amount of stub reactance selected is a compromise between the tuning range required and the amount of arc leakage which is permissible. When no coaxial stub is utilized it is possible, with a typical embodiment of the T-R device illustrated, to gap-space tune the resonator from 1210 megacycles to 1390 megacycles. The use of a stub as herein shown (the stub reactance being approximately 8.5 ohms) affords tuning from 1230 megacycles to 1370 megacycles while maintaining the total leakage substantially constant.

The arc leakage energy, which is minimized by the insertion of the coaxial stub as above described, and the direct coupled leakage, which is constant for a given transmitter power output, are cancelled in the output end of the T-R resonator 7 by a buckout, or feedback, loop 25. The loop couples energy from the coaxial transmission line 1 to the output side of the cavity resonator 7 and is of sufficient length to apply the buckout energy in phase opposition to the leakage energy. A load device 27 is connected in series with the buckout loop 25 to sufficiently attenuate the transmitter feedback energy. A harmonic filter (not shown) is preferably provided and connected between the T-R resonator and the receiver crystal.

The instant invention affords the following advantages. It is not necessary to readjust the buckout loop coupling each time the transmitter signal frequency is changed. Secondly, the operating life of the T-R tube 13, utilized in the re-entrant resonator 7, is increased since the discharge current flowing through the tube is further limited by the addition of the impedance of the coaxial stub. The design of the feedback loop 25 is simplified since there is no need to be concerned with the variational portion of the leakage energy. While the invention herein disclosed is utilized coupled to a coaxial transmission line, the device is equally suitable for use with circular and rectangular hollowpipe waveguides.

What is claimed is:

1. A switching device for controlling the flow of microwave energy through a microwave transmission line comprising, a cavity resonator adapted to be connected to said transmission line; a gas discharge tube disposed within said resonator, said tube including a pair of adjustable, spaced electrodes, said resonator being tunable by the adjustment of the spacing between said electrodes, and said tube conducting current when the energy in said transmission line exceeds a predetermined amplitude; output coupling means for deriving energy from said resonator, the amount of leakage power passing from said resonator through said coupling means being a function of the spacing of said electrodes; a short-circuited transmission line tuning stub less than one quarter wave length long over the operating frequency range of said cavity resonator formed as part of the wall structure of said cavity resonator, and effectively in series with said gas discharge tube, for substantially reducing the arc leakage component of the leakage power passed from said resonator to said output coupling means; and means coupled between said transmission line and said output coupling means for substantially reducing the direct coupled leakage components of said leakage power passed from said resonator through said output coupling means.

2. A switching device for controlling the flow of microwave energy through a microwave transmission line comprising, a cavity resonator adapted to be connected to said transmission line; a gas discharge tube disposed within said resonator, said tube including a pair of adjustable, spaced electrodes, said resonator being tunable by the adjustment of the spacing between said electrodes, and said tube conducting current when the energy in said transmission line exceeds a predetermined amplitude; output coupling means for deriving energy from said resonator, the amount of leakage power passing from said resonator through said coupling means being a function of the spacing of said electrodes; and a short-circuited transmission line tuning stub less than one quarter wave length over the operating frequency range of said cavity resonator effectively in series with said gas discharge tube for substantially reducing the arc leakage component of said leakage power passed from said resonator to said output coupling means, said stub being formed as a part of the wall structure of said cavity resonator.

3. In combination, a cavity resonator; a spark gap device of the type which fires when the energy in said cavity resonator exceeds a predetermined amplitude located in said cavity resonator, said spark gap device including a pair of spaced electrodes; means for adjusting the spacing between said electrodes; and a short-circuited coaxial line reactance element less than one quarter wave length long over the operating frequency range of said cavity resonator, opening on the interior of said cavity resonator, the center conductor of said element being symmetrically arranged around one of said electrodes.

4. In the arrangement as set forth in claim 3, further including a gas-filled tube in said resonator, said electrodes being located within said tube.

5. In the arrangement as set forth in claim 3, further including input means coupled to said cavity resonator; output means coupled to said cavity resonator; and a by-pass connection between said input means and output means for by-passing a portion of the energy in said input means to said output means in the correct sense to cancel at least a portion of the energy passed from said cavity resonator to said output means.

6. An arrangement for coupling one transmission line to another transmission line comprising, in combination, a cavity resonator coupled to both of said lines; a spark gap device in said resonator of the type which fires when energy in one of said lines exceeds a predetermined magnitude; means for tuning said resonator comprising means for adjusting the size of the gap in said spark gap device, the amount of arc leakage energy tending to pass from said resonator to the other of said lines when said spark gap device fires being a function of the size of said gap; and means for substantially reducing said arc leakage energy throughout the operating frequency range of said cavity resonator including an impedance element effectively in series with said spark gap device having an inductive reactance throughout said operating frequency range.

7. An arrangement for coupling one transmission line to another transmission line comprising, in combination, a cavity resonator coupled to both of said lines; a spark gap device in said resonator of the type which fires when energy in one of said lines exceeds a predetermined magnitude; means for tuning said resonator comprising means for adjusting the size of the spark gap in said spark gap device, the amount of arc leakage current tending to pass from said resonator to the other of said lines when said spark gap device fires being a function of the size of said spark gap; and means for substantially reducing said arc leakage current throughout the operating frequency range of said cavity resonator comprising a transmission line tuning element effectively in series with said spark gap device and having a length such that the same appears as an inductive reactance throughout said operating frequency range.

8. An arrangement for coupling one transmission line to another transmission line comprising, in combination, a cavity resonator coupled to both of said lines; a spark gap device in said resonator of the type which fires when energy in one of said lines exceeds a predetermined magnitude; means for tuning said resonator comprising means for adjusting the size of the gap in said spark gap device, the amount of arc leakage current tending to pass from said resonator to the other of said lines when said spark gap device fires being a function of the size of said gap; and means for substantially reducing said arc leakage current throughout the operating frequency range of said cavity resonator including a short-circuited transmission line tuning stub less than a quarter wave length long throughout said operating frequency range effectively connected in series with said spark gap device.

9. An arrangement for coupling one transmission line to another transmission line comprising, in combination, a cavity resonator coupled to both of said lines; a spark gap device in said resonator of the type which fires when energy in one of said lines exceeds a predetermined magnitude; means for tuning said resonator comprising means for adjusting the size of the gap in said spark gap device, the amount of arc leakage current tending to pass from said resonator to the other of said lines when said spark gap device fires being a function of the size of said gap; and means for substantially reducing said arc leakage current throughout the operating frequency range of said cavity resonator comprising a coaxial line tuning stub having a length such that the same appears as an inductance reactance throughout the operating frequency range of said cavity resonator effectively connected in series with said cavity resonator.

References Cited in the file of this patent

UNITED STATES PATENTS

| | | |
|---|---|---|
| 2,415,962 | Okress | Feb. 18, 1947 |
| 2,445,445 | Marcum | July 20, 1948 |
| 2,448,623 | Rose | Sept. 7, 1948 |
| 2,530,979 | Matland et al. | Nov. 21, 1950 |